Feb. 15, 1944. J. W. MORSE 2,342,007
METHOD AND APPARATUS FOR TREATING WASHED POTATOES
Filed July 21, 1941 7 Sheets-Sheet 1
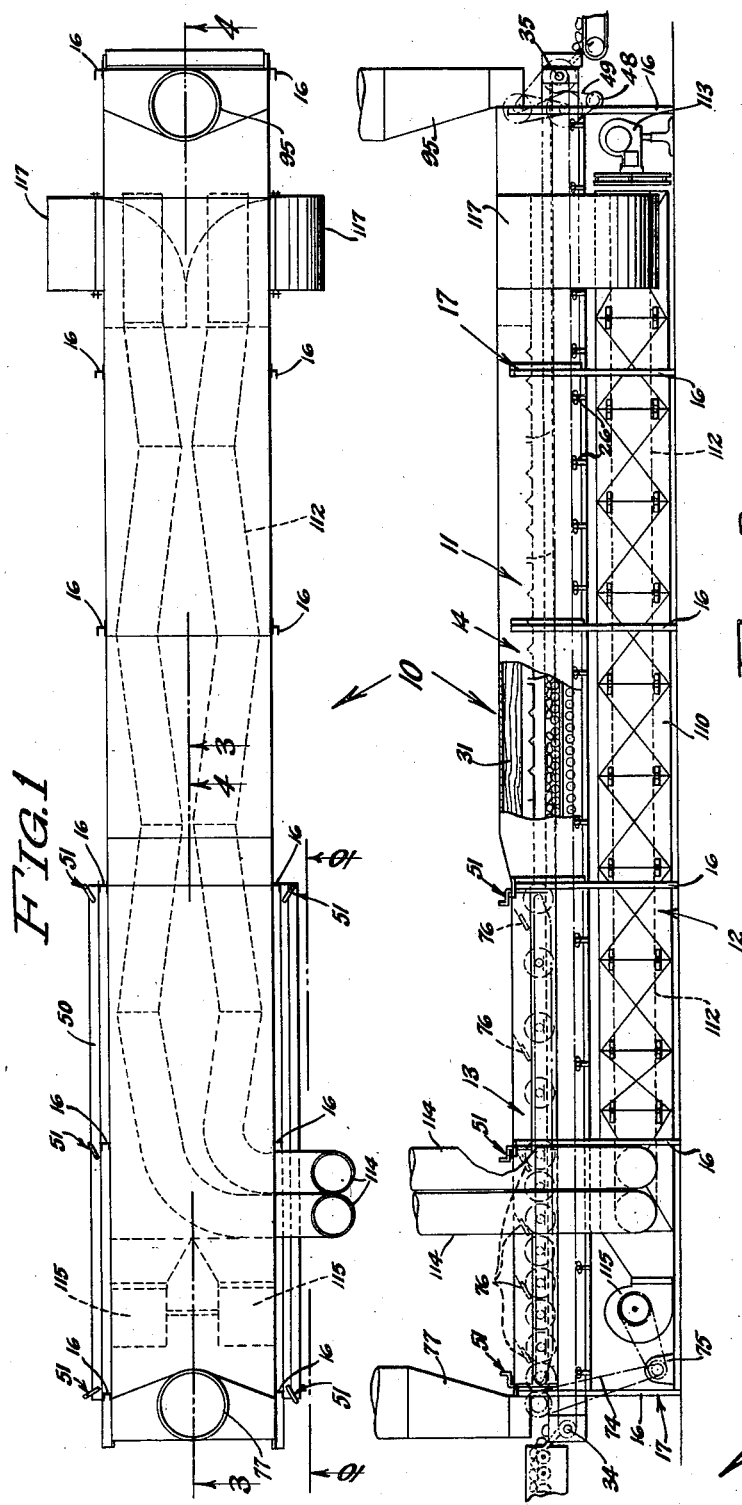
INVENTOR:
JAMES W. MORSE
BY
ATTORNEY

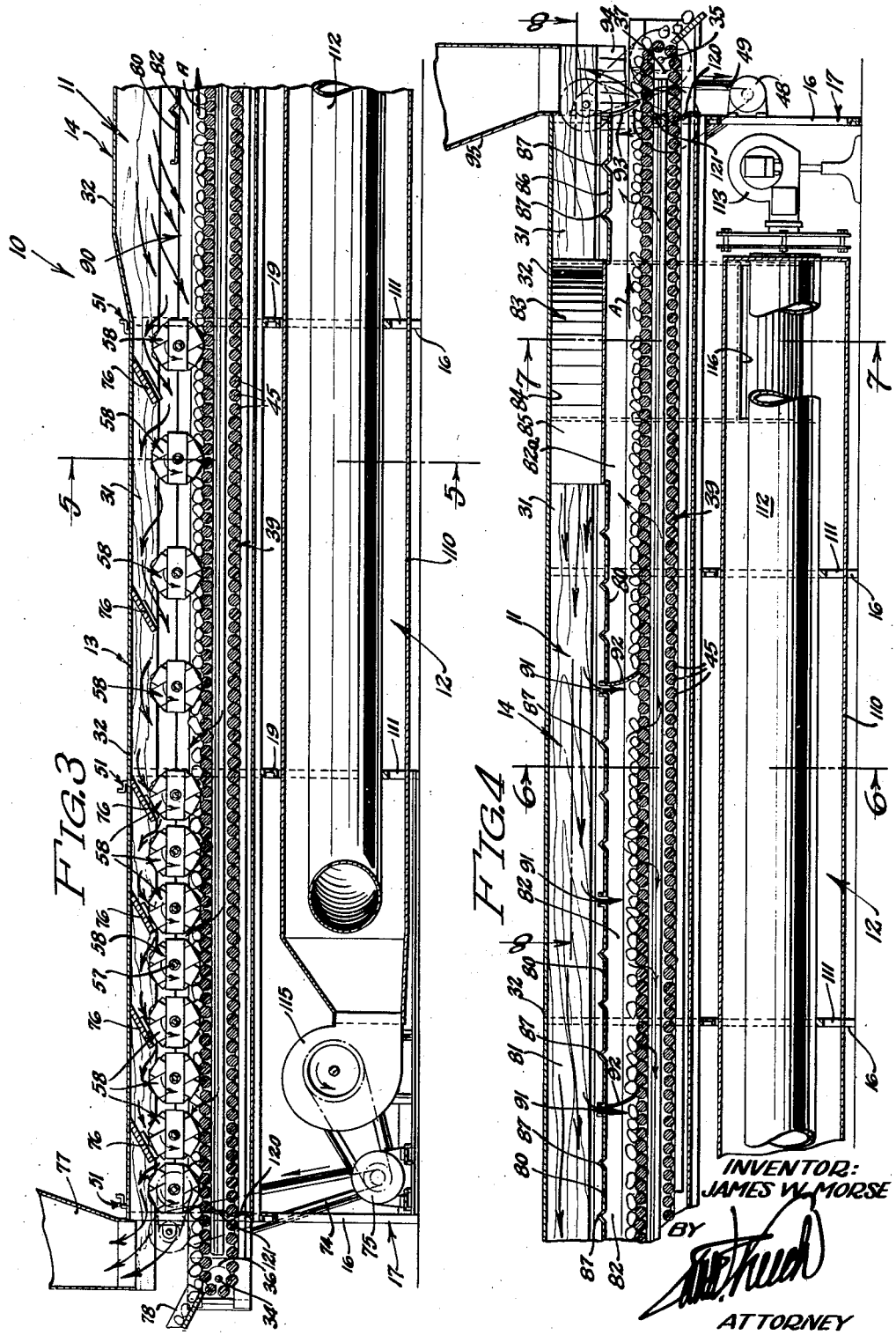

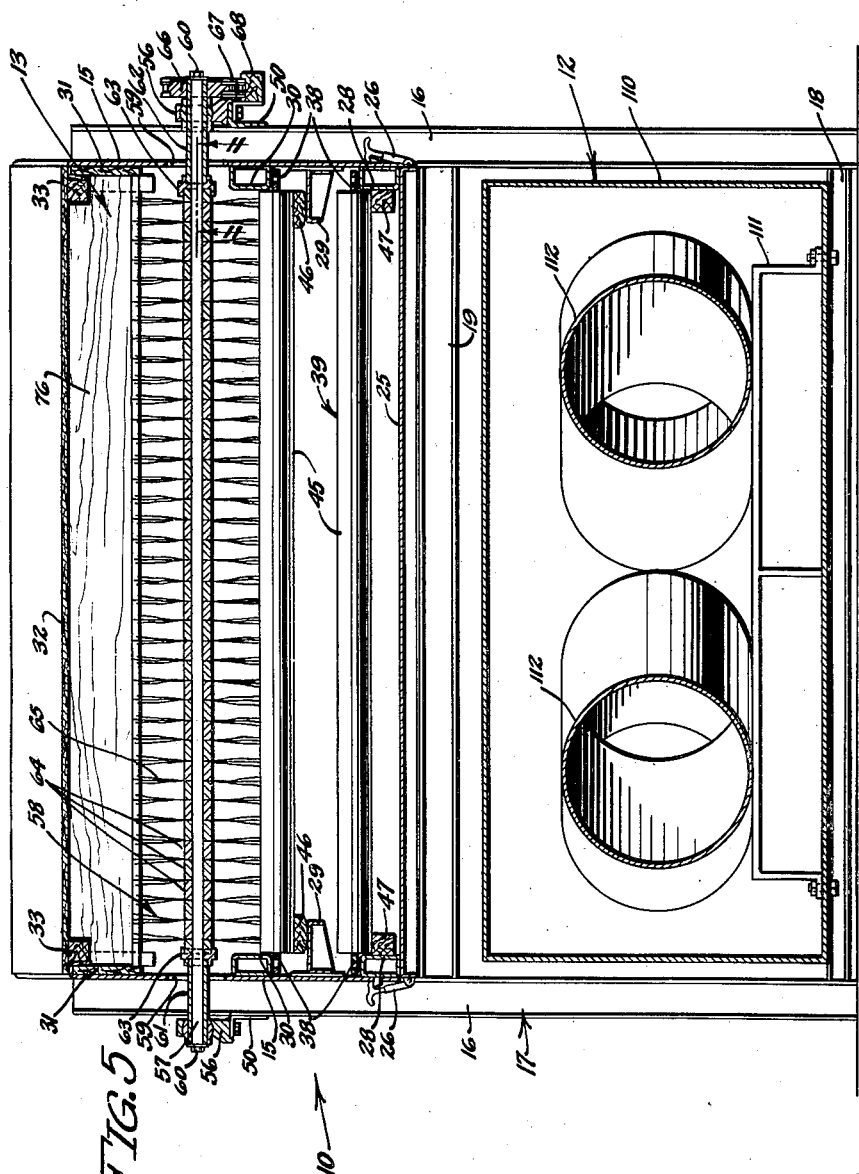

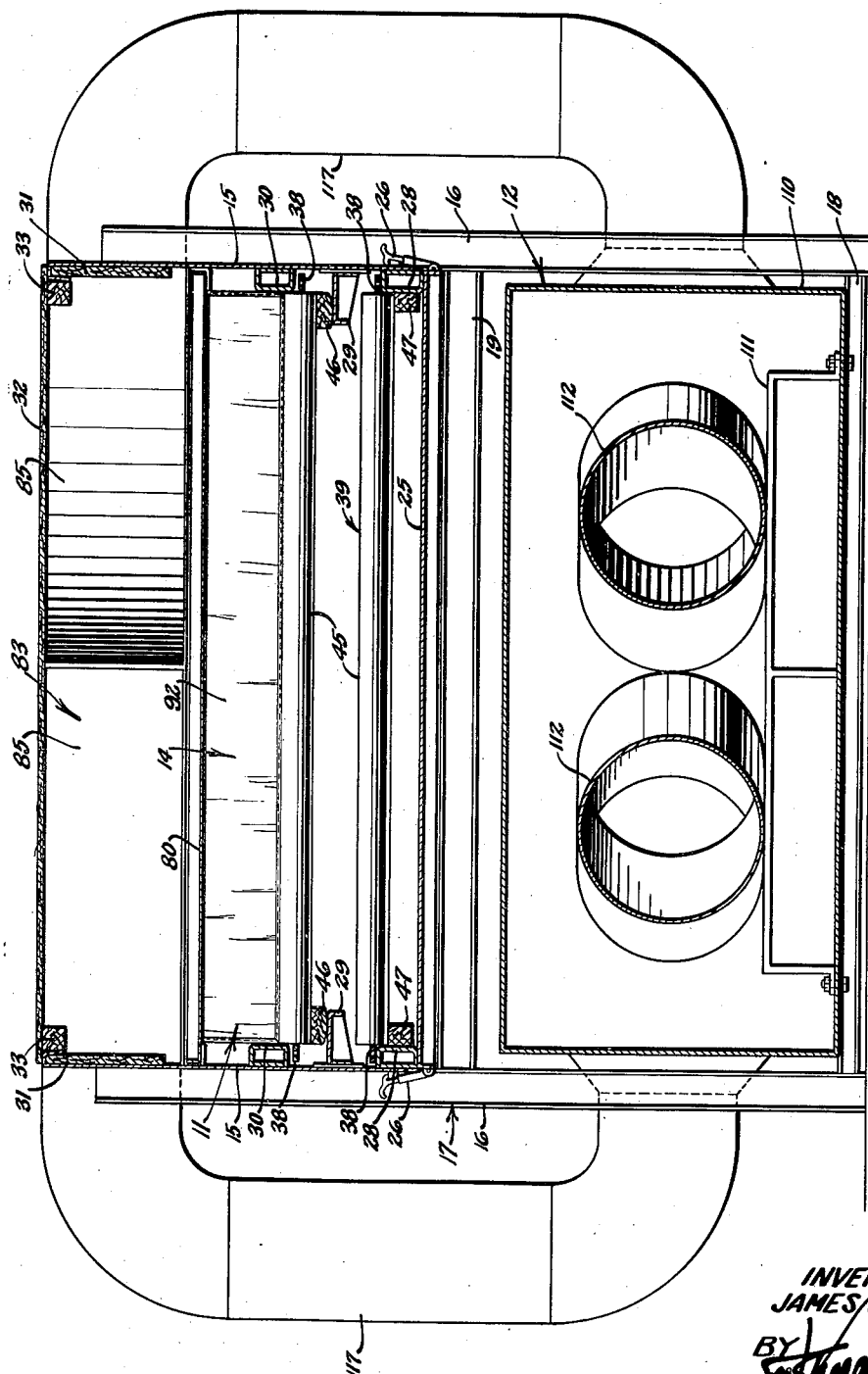

Feb. 15, 1944.  J. W. MORSE  2,342,007
METHOD AND APPARATUS FOR TREATING WASHED POTATOES
Filed July 21, 1941  7 Sheets-Sheet 5

INVENTOR:
JAMES W. MORSE
ATTORNEY

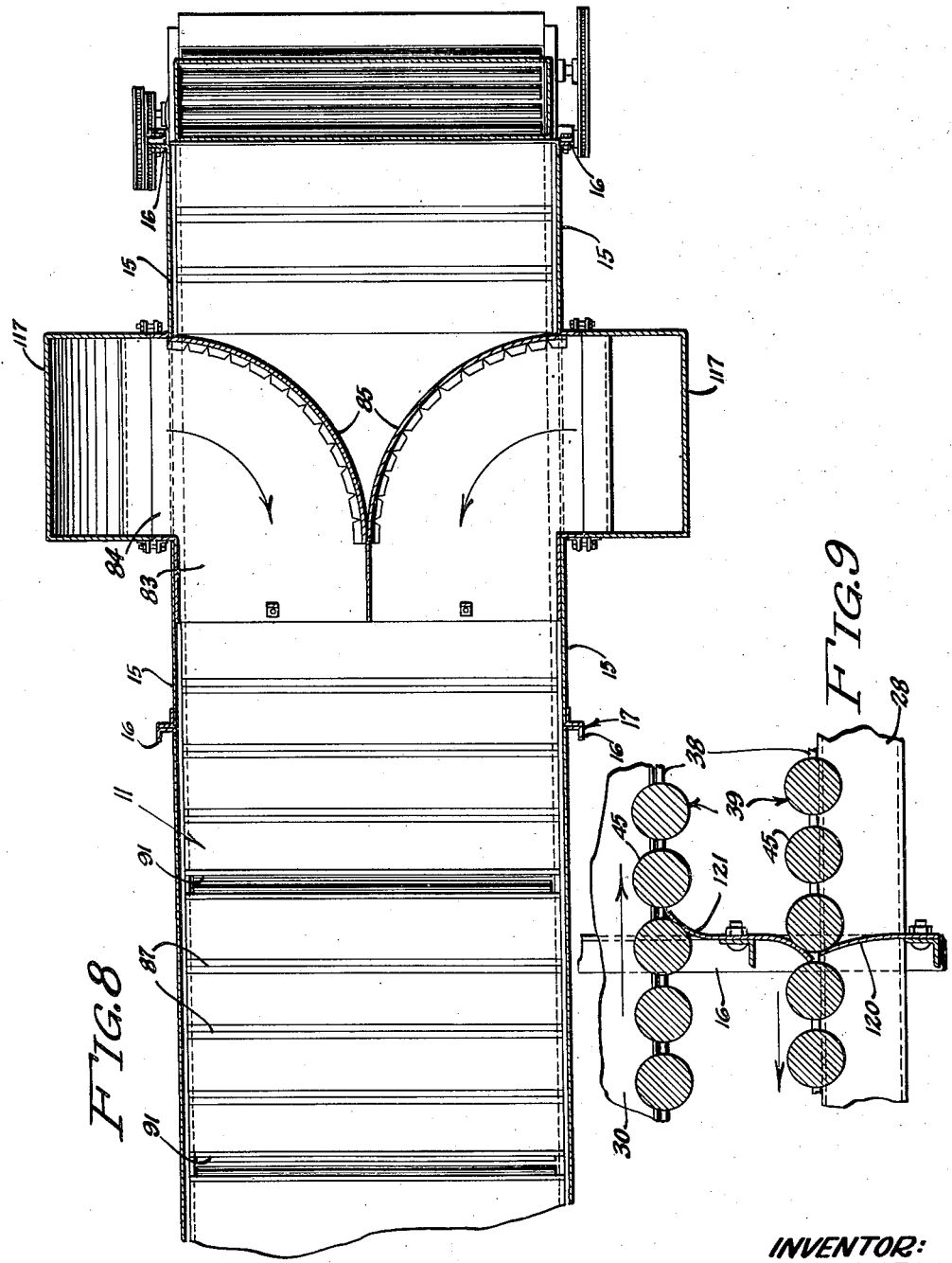

Feb. 15, 1944.  J. W. MORSE  2,342,007
METHOD AND APPARATUS FOR TREATING WASHED POTATOES
Filed July 21, 1941  7 Sheets-Sheet 7
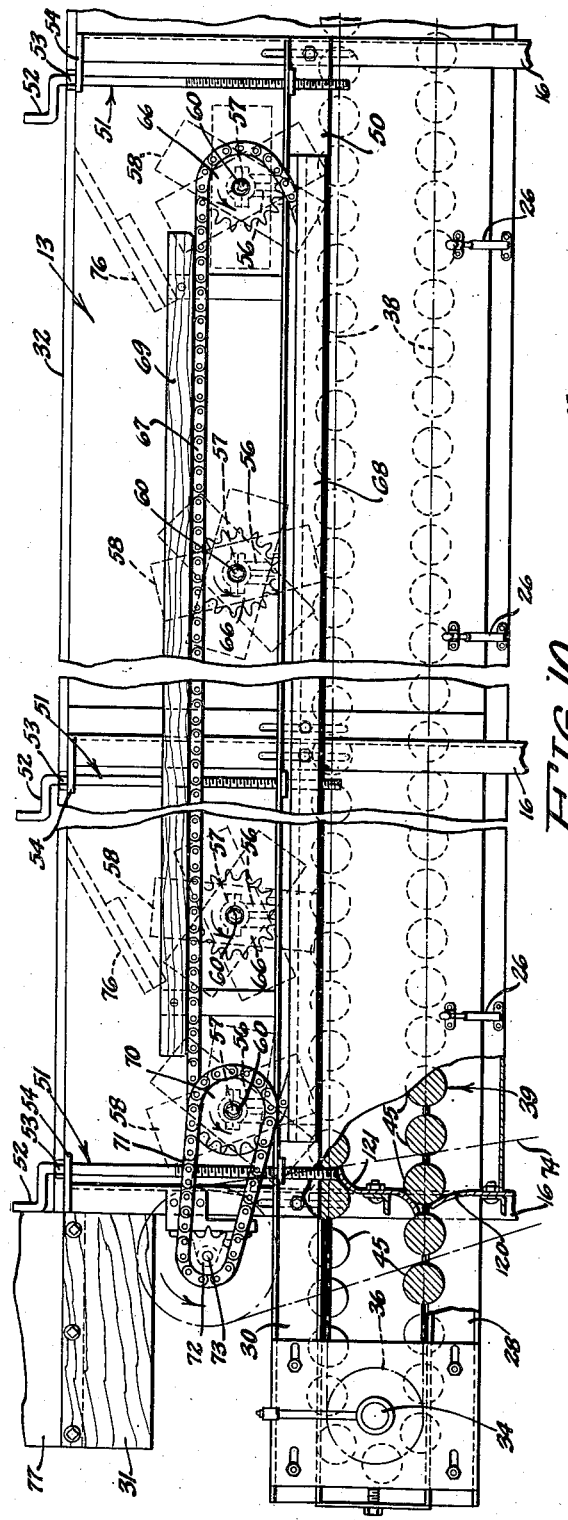
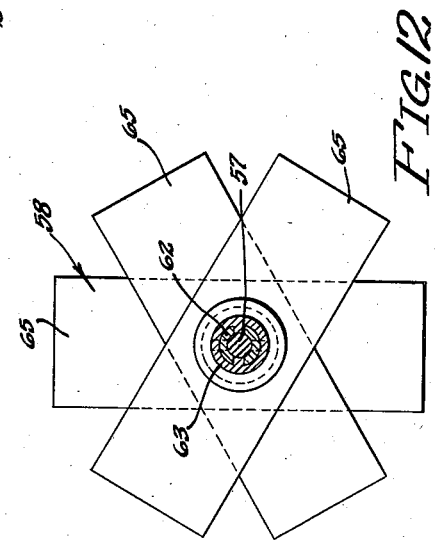
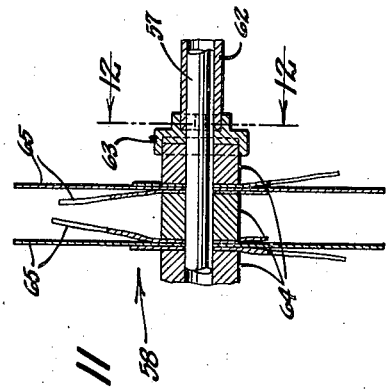
INVENTOR:
JAMES W. MORSE
BY
ATTORNEY Patented Feb. 15, 1944

2,342,007

UNITED STATES PATENT OFFICE 2,342,007

METHOD AND APPARATUS FOR TREATING WASHED POTATOES

James W. Morse, Lansing, Mich., assignor to Food Machinery Corporation, San Jose, Calif., a corporation of Delaware Application July 21, 1941, Serial No. 403,378

12 Claims. (Cl. 34—9)

This invention relates to the art of commercially preparing potatoes for shipment to market.

Improved methods generally in the retailing of fresh farm products have made it necessary for wholesale shippers of potatoes to wash these before they are sacked and loaded for shipment to market. The washing of potatoes, however, even under the best conditions commercially feasible, inoculates the entire surface of the potato with organisms causing soft rot. It has long been known that drying the potatoes after washing tends to greatly decrease losses from soft rot in potatoes enroute to market. Retailing as they do, at approximately two cents per pound, potatoes have to be produced and handled very economically in large quantities in order to realize even a very small margin of profit. The best methods and apparatus hitherto provided for the drying of potatoes have been relatively expensive and slow in operation.

It is accordingly an object of my invention to provide a method of and apparatus for treating washed potatoes which is relatively inexpensive in first cost, which will handle a large capacity, will accomplish its treatment in a relatively short period of time and will be comparatively inexpensive to operate per unit weight of potatoes treated.

The principal organisms causing soft rot in potatoes are known as *Bacillus aroideae* and *Bacillus carotovorus*. One of the processes previously offered from the treating of potatoes so as to dry these and render the potatoes resistant to decay involved the passage of the potatoes over approximately 120 feet of conveyor, which required about four minutes, and during which warm air at a temperature between 100° F. and 145° F. was blown over the potatoes. The theory of this prior art process was that evaporation of water from the skins of the potatoes traveling on this conveyor would keep the potato cool and thus prevent its cooking. I have found it to be true that said prior process does keep the potatoes cool by the evaporation of water therefrom but I have also found that under adverse atmospheric conditions it does not adequately remove the water from the surface of the potato, particularly from the eyes and other deep, narrow depressions in the skin. Furthermore, it does not accomplish a thorough kill of the soft rot bacteria.

It is another object of my invention to provide a method of and apparatus for treating washed potatoes which thoroughly dries the potatoes even under the most unfavorable atmospheric conditions met with in commercial practice and which gives a superior kill of the soft rot decay causing organisms with which the potatoes are inoculated by washing. The manner of accomplishing the foregoing objects, as well as further objects and advantages, will become manifest in the following description taken in connection with the accompanying drawings, in which:

Fig. 1 is a plan view of a preferred embodiment of the apparatus of my invention.

Fig. 2 is a side elevational view of Fig. 1, partially broken away to illustrate the interior of the apparatus.

Figure 7:
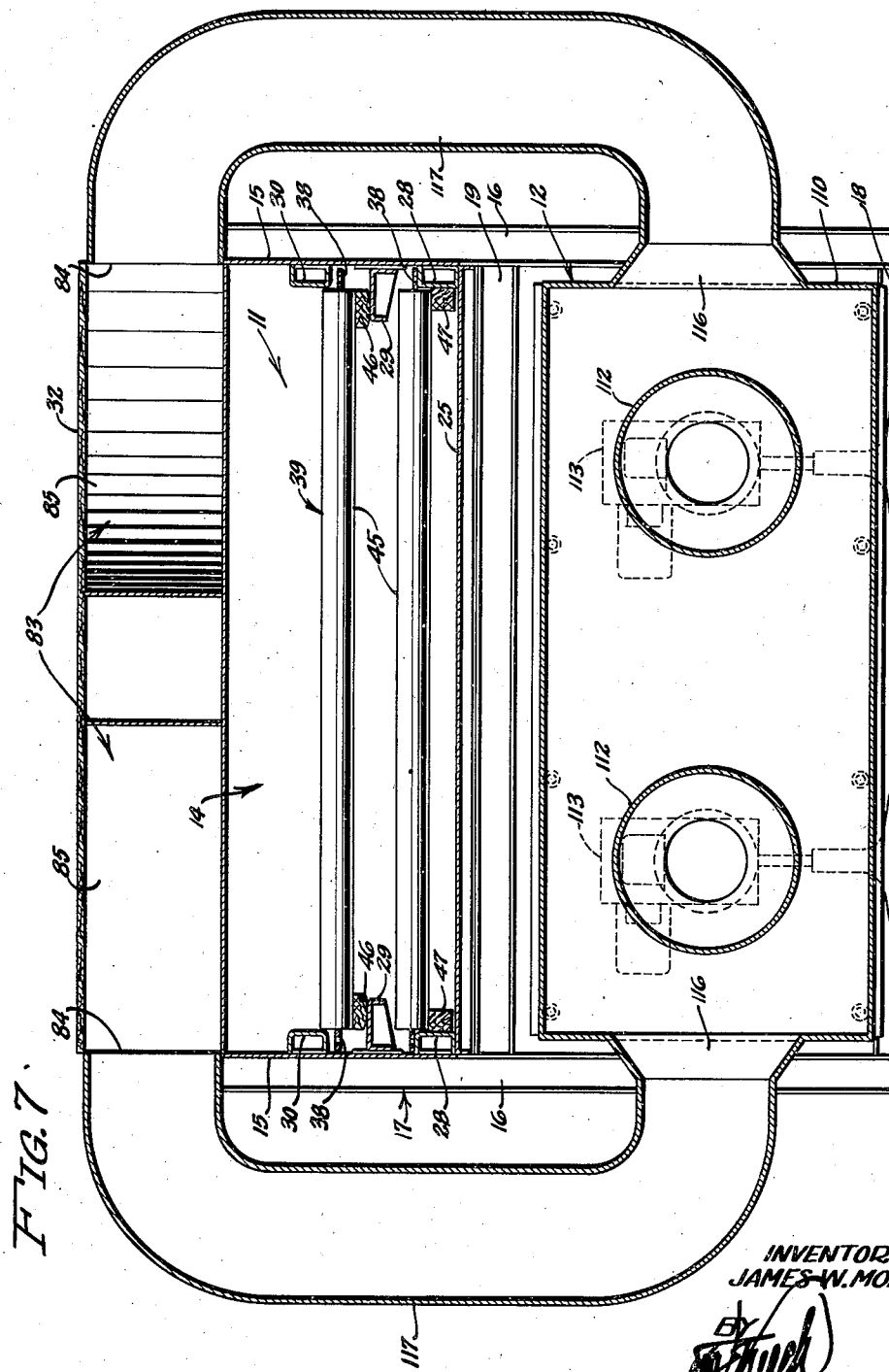

Figs. 3 and 4 are longitudinal sectional views of Fig. 1 taken on lines 3—3 and 4—4 respectively thereof.

Fig. 5 is an enlarged cross sectional view taken on the line 5—5 of Fig. 3.

Fig. 6 is an enlarged sectional view taken on the line 6—6 of Fig. 4.

Fig. 7 is an enlarged transverse sectional view taken on the line 7—7 of Fig. 4.

Fig. 8 is a fragmentary horizontal sectional view taken on the line 8—8 of Fig. 4.

Fig. 9 is a fragmentary enlarged cross sectional view of the valve flaps of the invention disposed at opposite ends of the apparatus for preventing the escape of moisture laden hot air.

Fig. 10 is an enlarged cross sectional view illustrating the heavy canvas belting baffles disposed at opposite ends of the conveyor of the invention.

Fig. 11 is an enlarged fragmentary detail sectional view taken on the line 11—11 of Fig. 5 and illustrating the construction of one of the buffers of the invention.

Fig. 12 is a cross sectional view taken on the line 12—12 of Fig. 11.

Referring specifically to the drawings, the numeral 10 indicates generally the preferred embodiment of the apparatus of my invention there illustrated. The drier 10 includes an oven 11 and a very large hot air furnace 12 which lies beneath the oven 10 and is practically co-extensive in length therewith.

The oven 11 includes a buffing section 13 and a flash drying section 14 and has side walls 15, the upper portions of which extend to a little higher level in the flash drying section 14 than they do in the buffing section 13. These side walls are supported on posts 16 of a framework 17, these posts being connected by bottom cross members 18 and middle cross members 19. The bottom of the oven 11 is covered by a series of bottom plates 25 which are removably held in place by spring hood catches 26.

Disposed against the inner faces of the walls 15 and secured thereto and to the posts 16 are metallic channel members 28, 29 and 30 and plates 31 of poplar wood or other fibrous material capable of resistance to relatively high temperatures, the upper edges of the walls 15 being preferably bent over the upper edges of the plates 31 and the top of the oven 11 is closed by sectional covers 32 having centering cleats 33 which align these covers laterally on the oven 11.

Mounted in suitable bearings provided on the channels 28 and 30 at the potato receiving end of the drier 10 is an idle conveyor shaft 34, while a drive shaft 35 is similarly mounted at the discharge end of the machine. Suitable sprockets 36 and 37 are provided on these shafts and endless chains 38 of an endless roller conveyor 39 are trained about these sprockets.

Pivotally mounted on pins carried on the chains 38 is an endless series of rollers 45. The rollers 45 in the upper flight of the conveyor 39 rest on wooden tracks 46 supported on channels 29, while those in the lower flight rest on wooden tracks 47 provided on channels 28. Provided on the forward end of the frame 17 is a motor 48 which is connected by a suitable transmission 49 to the shaft 35 so as to drive the conveyor 39 in the direction of the arrows A in Figs. 3 and 4.

Mounted to be slideable vertically on the outer faces of the posts 16 opposite the buffer section 13 are horizontal angle frame members 50. These members are adjustably supported so that their vertical position on the frame 17 may be varied by vertical screws 51 (see Fig. 10). These screws have hand cranks 52 and shoulders 53 which latter rest on ears 54 provided on the upper ends of the posts 16, the lower ends of the screws being threaded and being screwed into suitable holes in the horizontal flanges of the angles iron frame members 50. The members 50 support bearings 56 in which are journalled shafts 57 of rotary buffers 58. The shafts 57 extend through vertical slots 59 in the walls 15. The buffers 58 are assembled together on the shafts 57 by cap screws 60, screwed into opposite ends of the shaft which compress in assembled relation sleeves 61 and 62, collars 63, spacers 64 and heavy canvas buffer cloths 65, a plurality of which are compressed between each adjacent pair of spacers 64.

Each of the sleeves 62 is fitted with a sprocket 66, all of these sprockets being driven by a chain 67, the lower flight of which rests in a track 68 which is supported on the adjacent horizontal frame member 50. The upper flight of chain 67 is held down against sprocket 66 by a wooden guide 69.

The rearmost of the shafts 57 is provided with a sprocket 70 connected by a chain 71 to a sprocket 72 on a counter shaft 73, this counter shaft being driven through a chain transmission 74 by a motor 75 mounted on the frame 17. The buffers 58 are thus rapidly rotated in the direction of the arrows appearing on these in Fig. 3.

It is to be noted in Fig. 3 that the first 8 of the buffers 58 are disposed relatively close together, while the last four of these buffers are spaced substantial distances from each other and from the first 8 buffers. Secured at their opposite ends to the plates 31 and disposed in the upper part of buffer oven section 13 are baffle boards 76 which are obliquely disposed so as to deflect air downwardly from the upper portion of the oven towards the buffers 58. As shown in Fig. 3, only one of the baffle boards 76 is preferably provided for each pair of buffers 58.

At the receiving end of the drier 10 the plates 31 extend from the buffer oven section 13 to support the lower end of a moist hot air stack 77, the lower end of which is open, this stack preferably extending upwardly through the roof of the building in which the drier 10 is housed so as to discharge into the atmosphere outside the building. Mounted between ends of the frame channels 30 therebelow is a delivery board 78 over which potatoes are delivered onto the conveyor 39.

The space between the upper flight of the conveyor 39 and the covers 32 covering the flash drying oven section 14 is divided by a series of horizontal floor sections 80 to produce a fresh hot air passageway 81 in the upper portion of the oven and a flash-drying potato passageway 82 disposed between the upper flight of the conveyor 39 and the floor sections 80.

Fresh hot air is supplied to the passageway 81 through a manifold vestibule 83 (see Figs. 6, 7 and 8) having heated air receiving ports 84 which open outwardly through the side walls 15, and curved deflecting plates 85 which change the direction of heated air entering ports 84 so as to direct this air into the passageway 81 and toward the receiving end of the drier. Disposed horizontally on substantially the same level as the floor sections 80, and lying between the vestibule 83 and the discharge end of the drier 10 is a floor section 86. The floor sections 80 and 86 are stiffened by transverse corrugations 87 formed in the sheet metal of which these sections are preferably made.

As clearly shown in Fig. 3, considerable free space 90 is left between the last of the widely separated buffers 58 and the near edge of the nearest floor section 80. Adjacent floor sections 80 are also spaced apart to provide transverse fresh hot air discharge apertures 91. Fixed on certain of the floor sections 80 beyond certain of the apertures 91 are heavy curtains 92. Floor section 86 is also provided with a relatively loose flexible fringed curtain 93. A similar curtain 94 hangs downwardly from extended end portions of the plates 31. Supported on the plates 31 and extending upwardly from the space just above the discharge end of the conveyor 39 is a thermal-current stack 95 for the removal of water-saturated heated air which may escape from the discharge end of the drier 10.

Lying between the upper flight of conveyor 39, curtains 92 and 93, the vestibule 83 and adjacent floor sections 80 and 86 is a secondary air treating passageway 82a.

Hot air furnace 12

This furnace has a housing 110 which rests upon the lower frame cross members and is of almost the same width as the oven 11 and but very little shorter than the oven is in length. Suitable rests 111 provided in the housing 110 support furnace tubes 112 which preferably have a zig-zag configuration as shown in Fig. 1. Positioned at the ends of these tubes adjacent the right hand end of the furnace 12 are a pair of oil or gas burners 113 each of which directs a blast of burning fuel into the adjacent mouth of one of the furnace tubes 112. The opposite ends of the furnace tubes 112 turn and pass out of the housing 110 and upwardly to form stacks 114, which extend through the roof of the building and convey to the outside atmosphere the gases of combustion.

A pair of blowers 115 are mounted on the frame 17 next to the motor 75 and are driven by the latter so as to suck air in from the atmosphere surrounding the drier 10 and blow this into the adjacent end of the furnace housing 110. The opposite end of this housing has side openings 116 which are connected to the ports 84 in the oven vestibule 83 by manifold conduits 117.

Referring to Fig. 9, it is to be noted that heavy canvas flaps 120 and 121 are provided at the opposite ends of the oven 11 these flaps acting as valves to permit the passage of the rollers 45 of the conveyor 39 and closing in between the rollers to prevent the escape downwardly from the oven of moisture laden air.

Operation

It is to be noted that the drawings are illustrations to scale of a preferred embodiment of the drying apparatus of my invention. In this apparatus I employ a drying oven about 40 feet long and a hot air producing furnace which is practically the same size as this oven. Never before in the history of drying surface moisture from any fresh fruit or vegetable has such an emphasis been placed upon the heat element in such a drying operation and the results of this innovation more than justify this radical departure from the prior art.

The blowers 115 draw air from the atmosphere in the packing house in which the apparatus 10 is installed and deliver this air to the furnace 12 at a rate preferably of about 8400 CFM. This volume of air is heated efficiently and with a relatively small consumption of fuel by the furnace 12 so that when it is delivered to the apparatus oven 11 it is preferably at a temperature of between 212° F. and 240° F. While some deviation from this range is permissible, the temperature of the air when first delivered to the oven 11 should not be substantially below 200° F. This air is employed in the performance of two distinct and separate steps in the method of my invention.

The first of these steps is the mechanical removal from the skins of the potatoes of all the water that can be removed from these skins by a buffing or wiping operation. This step is rendered possible in the method and apparatus of my invention by the combined use of rotary buffers of the type shown with these spaced and rotated, as illustrated in Fig. 3, at a high rate of speed, and preferably at about 315 R. P. M., while subjecting these buffers to the action of a large portion of the total hot air output of the furnace 12 without this portion of this air having previously come in contact with any moisture. The first three or four of the twelve buffers employed in my apparatus are fairly wet while operating. The balance of the buffers however, are disposed far enough toward the end of the buffing section where the blast of very highly heated air first enters the buffing section, so that their efficiency as buffers is greatly enhanced by this flow of hot air.

The spacing of the final four buffers to contact the potatoes provides for very complete and intimate envelopment of these buffers by the blast of highly heated air delivered to the buffing section while this air is in a fresh, highly absorptive condition. This results in these last four buffers which are required to pick up less water from the potatoes than any of the other buffers to be especially well dried by the highly heated air enveloping these final four buffers. These last four buffers are thus kept in condition to apply a particularly efficient final buffing action to the potatoes with which they come in contact.

The potatoes on the conveyor 39 are constantly being rotated as they are conveyed so that all surfaces of the potatoes are submitted to the buffers. All of the buffers of course by virtue of their construction and high operating speed, extend into the eyes of the potatoes and into other irregularities in the potatoes so as to wipe surface water from all portions of the potatoes contacted, including the depressions. Thus when the potatoes pass out from under the last of the buffers the only surface water remaining on these potatoes is that which is held within the capillary interstices of the corky skin of the potatoes.

After having been subjected to the first step in the method of my invention and being conveyed as just described from under the last of the buffers 58 in the buffing oven section 13, the potatoes are subjected to the second step of the method of my invention. This involves what may be termed a flash drying operation which is effected by forcing downwardly through the buffed potatoes while these are rotating and traveling spread out on the conveyor 39, a series of streams of fresh, highly-heated air diverted from the main body of this air just arriving from the furnace 12 and flowing in the direction indicated by the arrows in Fig. 4 along the hot air passageway 81 of the flash drying oven section 11. As clearly shown in this figure these streams of air are fed downwardly through the transverse apertures 91 and are trapped in the shallow flash-drying passageway 82 so that this air immediately envelops these potatoes and then passes downwardly, around and between the potatoes and out of this passageway by escaping between adjacent rollers 45 of the upper flight of the conveyor 39.

While as already stated, the best previously known process of treating potatoes in which the potatoes are dried requires approximately four minutes for its treatment and involves the use of 120 feet of conveyor, my process requires the use of only about 40 feet of conveyor and my entire process completes its operation in from one to one and one-half minutes. It is thus seen that the potatoes travel through the buffing section 13 of my process in from 24 to 36 seconds.

The flash drying step of the invention starts when the potatoes come out from under the last buffer 58 into contact with the fresh highly heated air in the space 90 and ends when these potatoes move under the last of the curtains 92, as shown in Fig. 4. The flash drying step of my process preferably consumes approximately from 21 to 32 seconds. In this flash drying step the action on the potatoes varies somewhat depending upon the degree of maturity of the potatoes being handled. The new potatoes have relatively smooth, thin skins so that there is not much water contained in the interstices of their skins. The new potatoes therefore are completely dried before they pass through the flash drying section. Owing to their tenderness the new potatoes receive much more injury from handling during harvesting. They are therefore more thoroughly inoculated with soft rot causing organisms in the washing step and it is particularly difficult therefore to make a complete kill of these organisms on the new potatoes. The relatively high temperature of the air in the flash drying step of my method, after drying the skin of the new potatoes, operates for a sufficient period on the soft rot bacteria on the surfaces of these new potatoes to give them an especially effective kill, yet without injury to the potatoes. The temperature of the potatoes is necessarily slightly raised in order to effect this kill. This raise is preferably not over 5° F.

The older potatoes have thicker skins which are both tougher than those of new potatoes and therefore less susceptible to injury and inoculation but they are also possessed of a greater capacity for absorbing water and therefore contain more water to be driven off in the flash drying step. In spite of this fact, the flash drying step is adequate under normal drying conditions to completely remove the moisture from the skins of the older potatoes. Because of the greater resistance of the older potatoes to inoculation I have found that the driving of the moisture from the skins of the older potatoes by the flash drying step produces an adequate kill of the soft rot bacteria with which they may be infected.

Following the second or flash drying step of my method, all of the potatoes treated by this method are subjected to a third step which takes place as the potatoes travel along the passageway 82a. This third step preferably consumes approximately 15 to 22 seconds and is useful as an auxiliary to the flash drying step of the invention in that it applies air once used in the flash drying step and therefore somewhat cooled from the boiling temperature at which it originally contacted the potatoes. This air which has picked up a good deal of moisture and is normally at a temperature of about 180° F. rises up between the rollers 45 of the upper flight of the conveyor 39 and envelops the potatoes carried thereon in the passageway 82a. This third step insures that all the water will be evaporated from the older potatoes under the most adverse drying conditions.

While the water is evaporated first in the flash drying step of my invention from those portions of the potato skin which are outwardly exposed, the evaporation of the water from the potato skin lying within the eyes and other depressions of the potato rapidly follows the drying of more exposed portions of the skin because of the fact that in the initial or buffing step of the method of my invention the excess water has been completely removed from all portions of the potato skin including those lying in these recesses.

Though I have obtained the advantages above pointed out from the use of much higher temperatures than ever previously applied in the treating of washed potatoes, I am able to do this without injury to the potatoes only by virtue of the relatively short periods which the highly heated air is thus applied. The complete drying of the potatoes accomplished by my method under even the most adverse atmospheric conditions results in part from its making use of some of the air already used in the flash drying step to perform a third and relatively auxiliary drying step on the potatoes as these travel along the passageway 82a.

That portion of the air once used in the flash drying step which does not flow forwardly to take part in the final drying step of my method, flows rearwardly to rise up into the space surrounding the buffers 58 in the buffing oven section 13. Here this air mingles with the other hot air traveling rearwardly through the buffer section and serves to continually evaporate moisture from the buffers as well as absorb the particles of moisture thrown off from the buffers so that when this air reaches the potato receiving end of the apparatus and pours upwardly because of its buoyancy into the stack 77 it is not far short of being 100% humid.

The hot air which is employed for a second time in the final drying step of the method escapes past the curtain 93 and is sucked upwardly by the thermal currents set up in the exhaust pipe 95. Although this air is considerably less humid than the air passing up the stack 77, it represents only a small fraction of the total air delivered from the heater 12 to the oven 11. This indicates the relatively high degree of heat efficiency made possible by the method of my invention.

The vertical adjustability of the frame supporting the buffers 58 which is effected by rotation of the screws 51 (see Figs. 3 and 10) is to permit these buffers to be adapted to make proper contact with different lots of potatoes which vary in average size. With the larger potatoes, of course, these buffers have to be raised from the position in which they operate properly on relatively small potatoes.

It is of considerable importance that the buffers 58 be made of a large number of relatively light fabric webs which are spaced close enough together so that all of the potatoes get properly treated by each of the buffers under which these potatoes pass, but yet the buffers do not engage the potatoes with sufficient force to throw the potatoes forwardly away from the buffer before the buffer has had a chance to properly treat the potatoes.

Where extremely adverse weather conditions are met with the speed of the conveyor 39 may of course be slowed down so that it will take as much as a minute and a half for the potatoes to pass through the apparatus 10, this generally being an ample period to insure adequate treatment.

What I claim is:

1. A method of treating washed potatoes to preserve the same from decay during shipment to market, which consists in first mechanically removing from the potatoes all surface water except that held in the capillary interstices of the potato skins, and then subjecting the potatoes to relatively dry air heated to a temperature within a range of approximately 200° F.–240° F. for a period insufficient to cook said potatoes or to scorch the skin thereof but adequate to vaporize the water in said interstices, leaving the surfaces of said potatoes dry.

2. A method of treating washed potatoes to preserve the same from decay during shipment to market, which consists in conveying said potatoes spread out horizontally, rotating said potatoes while they are thus being conveyed, buffing said potatoes during an initial portion of their travel when so conveyed to absorb and remove from the surface of said potatoes all of the surface water excepting that residing in the capillary interstices of the potato skin, and, at successive intervals in the balance of said travel, forcing streams of fresh air heated to a temperature not substantially less than 200° F. nor substantially greater than 240° F. into and through spaces between adjacent potatoes spread out and conveyed as aforesaid for a period insufficient to cook said potatoes, or to scorch the skin thereof but adequate to vaporize the water in said interstices, leaving the surfaces of said potatoes dry.

3. A method of treating washed potatoes to preserve the same from decay during shipment to market, which consists in mechanically removing from said potatoes all of the moisture from the skin thereof excepting the moisture trapped in the capillary interstices of the potato skins, subjecting said potatoes to a flash drying step in which said potatoes are treated with a current of fresh, dry, hot air at a temperature not substantially less than 200° F. nor substantially greater than 240° F. for a period of approximately 21 to 32 seconds.

4. A method of treating washed potatoes to preserve the same from decay during shipment to market, which consists in mechanically removing from the outside of said potatoes all water excepting that trapped in the capillary interstices of the potato skin, applying to said potatoes, after having been thus treated, a stream of fresh air heated to a temperature not substantially less than 200° F. nor substantially greater than 240° F. for a period of approximately 21 to 32 seconds, and then subsequent to the treatments aforesaid subjecting said potatoes for a period of approximately 15 to 22 seconds to a current of heated, humid air just previously used in the second step of said method aforesaid.

5. In a device for treating washed potatoes, the combination of: a housing forming an elongated chamber including a buffing section followed by a flash drying section; endless roller conveyor means in said chamber for carrying potatoes through said chamber, there being a relatively shallow treating space in said chamber above said conveyor means; a series of rotary buffers mounted in said treating space in said buffing section; means for rapidly rotating said buffers to wipe excess moisture from said potatoes entering said chamber; horizontal floor means forming a hot air passage in the upper portion of said chamber in said flash drying section; and means for delivering fresh hot dry air into said passage, the rear end of said passage being open and discharging said air, unvitiated by previous contact with moisture, directly against the ultimate buffer of said buffing section and discharging said air downwardly, likewise unvitiated, directly against the potatoes travelling away from said buffer and through said flash drying section.

6. In a device for treating washed potatoes, the combination of: a housing forming an elongated chamber including a buffing section followed by a flash drying section; endless roller conveyor means in said chamber for carrying potatoes through said chamber, there being a relatively shallow treating space in said chamber above said conveyor means; a series of rotary buffers mounted in said treating space in said buffing section; means for rapidly rotating said buffers to wipe excess moisture from said potatoes entering said chamber; horizontal floor means forming a hot air passage in the upper portion of said chamber in said flash drying section; and means for delivering fresh hot dry air into said passage, the rear end of said passage being open and discharging said air, unvitiated by previous contact with moisture, directly against the ultimate buffer of said buffing section and discharging said air downwardly, likewise unvitiated, directly against the potatoes travelling away from said buffer and through said flash drying section, there being opening means provided in said floor means and spaced forwardly from the rear open end of said passage, said opening means permitting additional fresh hot dry air, unvitiated as aforesaid, to flow downwardly from said passage against said potatoes travelling through said flash drying section.

7. In a device for treating washed potatoes, the combination of: a housing forming an elongated chamber including a buffing section followed by a flash drying section; endless roller conveyor means in said chamber for carrying potatoes through said chamber, there being a relatively shallow treating space in said chamber above said conveyor means; a series of rotary buffers mounted in said treating space in said buffing section; means for rapidly rotating said buffers to wipe excess moisture from said potatoes entering said chamber; horizontal floor means forming a hot air passage in the upper portion of said chamber in said flash drying section; and means for delivering fresh hot dry air into said passage, the rear end of said passage being open and discharging said air, unvitiated by previous contact with moisture, directly against the ultimate buffer of said buffing section, there being a series of longitudinally spaced openings provided in said floor means, said openings permitting fresh hot dry air, unvitiated as aforesaid, to flow downwardly from said passage against the potatoes travelling through said flash drying section.

8. In a device for treating washed potatoes, the combination of: a housing forming an elongated chamber including a buffing section followed by a flash drying section; endless roller conveyor means in said chamber for carrying potatoes through said chamber, there being a relatively shallow treating space in said chamber above said conveyor means, a series of rotary buffers mounted in said treating space in said buffing section; means for rapidly rotating said buffers to wipe excess moisture from said potatoes entering said chamber; horizontal floor means forming a hot air passage in the upper portion of said chamber in said flash drying section; means for delivering fresh hot dry air into said passage, the rear end of said passage being open and discharging said air, unvitiated by previous contact with moisture, directly against the ultimate buffer of said buffing section, there being opening means provided in said floor means and spaced forwardly from the rear open end of said passage, said opening means permitting fresh hot dry air, unvitiated as aforesaid, to flow downwardly from said passage against the potatoes travelling through said flash drying section; and curtain means in the treating space of said flash drying section, said curtain means extending from said floor means into contact with the potatoes thereby confining in said space the fresh hot dry air flowing downwardly through said opening means and compelling a substantial portion of said air to flow downwardly through said potatoes.

9. A method of treating washed potatoes to preserve the same from decay during shipment to market, which consists in: conveying said potatoes in a stream traveling in a given direction; rotating said potatoes as they are thus conveyed; vigorously buffing said potatoes over a substantial initial zone of said travel; applying fresh dry hot air to said potatoes at the discharge end of said zone so that said air flows through said zone counter to the direction of travel of said potatoes, the temperature of said air being insufficient to cook said potatoes during said application thereto, said buffing step removing all surface water from said potatoes except that residing in the surface interstices thereof; and then subjecting said potatoes in their travel as aforesaid after leaving said zone to successive applications of fresh dry hot air, said last mentioned applications being at a temperature and covering a total period insufficient to cook said potatoes or to scorch the skin thereof, but adequate to vaporize all of the water left in the surface interstices of said potatoes at the end of said buffing step and leaving the surfaces of said potatoes dry.

10. A method of treating washed potatoes to preserve the same from decay during shipment to market, which consists in: conveying said potatoes in a stream traveling in a given direction; rotating said potatoes as they are thus conveyed; vigorously buffing said potatoes for approximately 24–36 seconds in an initial zone of said travel; applying fresh dry hot air to said potatoes at the discharge end of said zone so that said air flows through said zone counter to the direction of travel of said potatoes, the temperature of said air being insufficient to cook said potatoes during said application thereto, said buffing step removing all surface water from said potatoes except that residing in the surface interstices thereof; and then subjecting said potatoes in their travel as aforesaid after leaving said zone to successive applications of fresh dry hot air within a temperature range of approximately 200° F.–240° F., said last mentioned applications covering a total period insufficient to cook said potatoes or to scorch the skin thereof, but adequate to vaporize all of the water left in the surface interstices of said potatoes at the end of said buffing step and leaving the surfaces of said potatoes dry.

11. A method of treating washed potatoes to preserve the same from decay during shipment to market, which consists in: conveying said potatoes in a stream traveling in a given direction; rotating said potatoes as they are thus conveyed; vigorously buffing said potatoes over a substantial initial zone of said travel; applying fresh dry hot air to said potatoes at the discharge end of said zone so that said air flows through said zone counter to the direction of travel of said potatoes, the maximum temperature of said air being insufficient to cook said potatoes during said application thereto, said buffing step removing all surface water from said potatoes except that residing in the surface interstices thereof; and then subjecting said potatoes in their travel as aforesaid after leaving said zone to successive applications of fresh dry hot air at substantially the same maximum temperature and without cooking said potatoes, said last mentioned applications covering a total period of approximately 21–32 seconds, and vaporizing all the water left in the surface interstices of said potatoes at the end of said buffing step and leaving the surfaces of said potatoes dry.

12. A method of treating washed potatoes to preserve the same from decay during shipment to maket, which consists in: conveying said potatoes in a stream traveling in a given direction; rotating said potatoes as they are thus conveyed; vigorously buffing said potatoes over a substantial initial zone of said travel; applying fresh dry hot air to said potatoes at the discharge end of said zone so that said air flows through said zone counter to the direction of travel of said potatoes, the temperature of said air being within a range of approximately 200° F.–240° F. when first applied to said potatoes, said buffing step removing all surface water from said potatoes except that residing in the surface interstices thereof; and then subjecting said potatoes in their travel as aforesaid after leaving said zone to successive applications of fresh dry hot air within substantially the same temperature range, said last mentioned applications covering a total period insufficient to cook said potatoes or to scorch the skin thereof, but adequate to vaporize all of the water left in the surface interstices of said potatoes at the end of said buffing step, and leaving the surfaces of said potatoes dry.

JAMES W. MORSE.